(12) United States Patent
Liao et al.

(10) Patent No.: US 10,259,132 B2
(45) Date of Patent: Apr. 16, 2019

(54) TUBE CUTTER

(71) Applicant: Hanlong Industrial Co., Ltd., New Taipei (TW)

(72) Inventors: Chien-Chou Liao, New Taipei (TW); Chien-Wei Huang, New Taipei (TW)

(73) Assignee: Hanlong Industrial Co., Ltd., New Taipei (TW)

( * ) Notice: Subject to any disclaimer, the term of this patent is extended or adjusted under 35 U.S.C. 154(b) by 193 days.

(21) Appl. No.: 15/382,789

(22) Filed: Dec. 19, 2016

(65) Prior Publication Data

US 2018/0085963 A1 Mar. 29, 2018

(30) Foreign Application Priority Data

Sep. 23, 2016 (TW) .............................. 105214612 U

(51) Int. Cl.
*B26D 3/16* (2006.01)
*B26B 27/00* (2006.01)
*B23D 21/10* (2006.01)

(52) U.S. Cl.
CPC ............. *B26D 3/169* (2013.01); *B23D 21/10* (2013.01); *B26B 27/00* (2013.01)

(58) Field of Classification Search
CPC ......... Y10T 83/04; B26B 27/00; B26D 3/169; B26D 2001/006; B26D 1/0006; B26D 3/001; B23D 21/10

USPC .......... 30/249, 134, 92, 250, 123, 355, 92.5, 30/93–108

See application file for complete search history.

(56) References Cited

U.S. PATENT DOCUMENTS

| | | | |
|---|---|---|---|
| 7,127,819 B1 * | 10/2006 | Huang | B23D 21/06 30/92 |
| 7,346,986 B2 * | 3/2008 | Feith | B26B 17/00 30/258 |
| 2007/0289140 A1 * | 12/2007 | Marcon | B26D 3/169 30/92 |
| 2012/0102752 A1 * | 5/2012 | Steele | B26D 3/001 30/92 |

* cited by examiner

*Primary Examiner* — Ghassem Alie
(74) *Attorney, Agent, or Firm* — Alan D. Kamrath; Kamrath IP Lawfirm, P.A.

(57) ABSTRACT

A tube cutter includes a first clamp handle, a second clamp handle, a blade, and a holder. The first clamp handle includes an opening. The second clamp handle is pivotally connected with the first clamp handle. The blade is connected with the second clamp handle. The holder includes a first recess and at least one second recess, and the first recess has a width wider than that of the at least one second recess. The holder is movably connected with the first clamp handle to form a first state or a second state with respect to the first clamp handle. The first recess is located at the opening when in the first state and the second recess is located at the opening when in the second state.

5 Claims, 7 Drawing Sheets

TUBE CUTTER

BACKGROUND OF THE INVENTION

1. Field of the Invention

The present invention relates to a tube cutter and, more particularly, to a tube cutter which can be used to cut tubes having different size apertures.

2. Description of the Related Art

FIG. 1A illustrates a view of a traditional tube cutter. Presently, the tube cutter 1a comprising a single-sized U-shaped opening 11a is used for holding a tube 80. When a tube having a smaller size aperture than that of the opening 11a is being cut by the tube cutter 1a, and since the contact area between the tube 80 and the U-shaped opening 11a becomes smaller, a smaller supporting force of the U-shaped opening 11a is applied to the tube, so that the tube 80 may be deformed when pressed by the blade 30a, which also deforms the inner tube (not shown in figure) in the tube. The deformation of the inner tube will affect the operation of the wiring within, resulting in wiring construction problems.

Therefore, it is necessary to design a new tube cutter which can solve the problem described above.

SUMMARY OF THE INVENTION

It is an object to provide a tube cutter which can be used to cut tubes having different size apertures.

In order to achieve the above object, the present invention discloses a tube cutter comprising a first clamp handle, a second clamp handle, a blade, and a holder. The first clamp handle comprises an opening. The second clamp handle is pivotally connected with the first clamp handle. The blade is connected with the second clamp handle, and a portion of the blade can be inserted into the opening by rotating the second clamp handle. The holder comprises a first recess and at least one second recess, and the first recess has a width wider than that of the at least one second recess; the holder is movably connected with the first clamp handle to form a first state or a second state when moving or rotating with respect to the first clamp handle. The first recess is located at the opening when in the first state, and the second recess is located at the opening when in the second state. Therefore, the first recess and the at least one second recess can be used to hold tubes having different size apertures to allow the tube cutter to cut tubes having different size apertures.

According to an embodiment of the present invention, the tube cutter further comprises a positioning mechanism connected with the first clamp handle to fix the holder.

According to an embodiment of the present invention, the holder comprises a cavity, and the positioning mechanism comprises a lever, a connecting rod, and a positioning column. The lever is movably combined with the first clamp handle and the holder, and the lever is connected to one end of the connecting rod. The positioning column is connected to the other end of the connecting rod, and the positioning column can be inserted into or withdrawn from the cavity by moving the lever.

According to an embodiment of the present invention, the positioning mechanism further comprises a spring disposed around the lever to provide an elastic force to the lever.

According to an embodiment of the present invention, the at least one second recess comprises two second recesses with different widths.

According to an embodiment of the present invention, the holder is formed in a disc shape.

According to an embodiment of the present invention, the first recess has a width substantially equal to that of the opening.

BRIEF DESCRIPTION OF THE DRAWINGS

These and other objects and advantages of the present invention will become apparent from the following description of the accompanying drawings, which disclose several embodiments of the present invention. It is to be understood that the drawings are to be used for purposes of illustration only, and not as a definition of the invention.

In the drawings, similar reference numerals denote similar elements throughout the several views.

DETAILED DESCRIPTION OF THE PREFERRED EMBODIMENTS

Figure 1A:
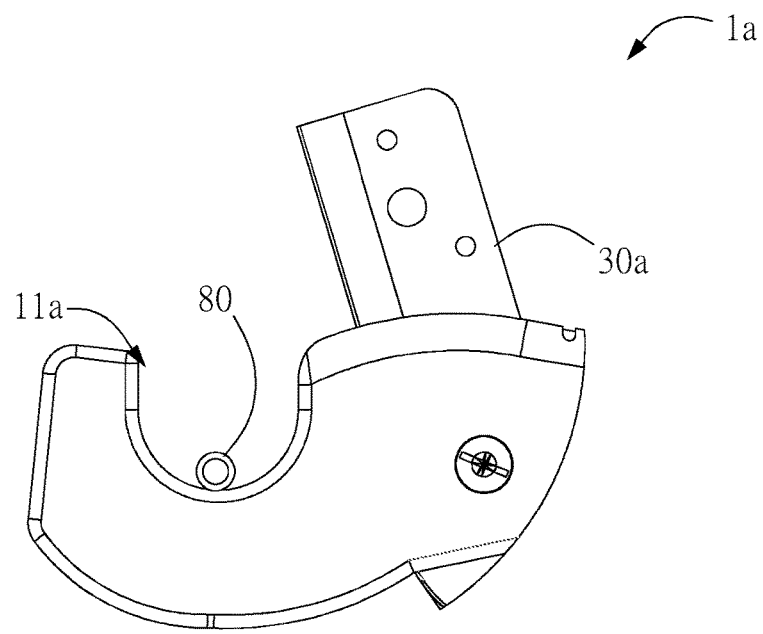
FIG. 1A illustrates a view of a traditional tube cutter.
Figure 1B:
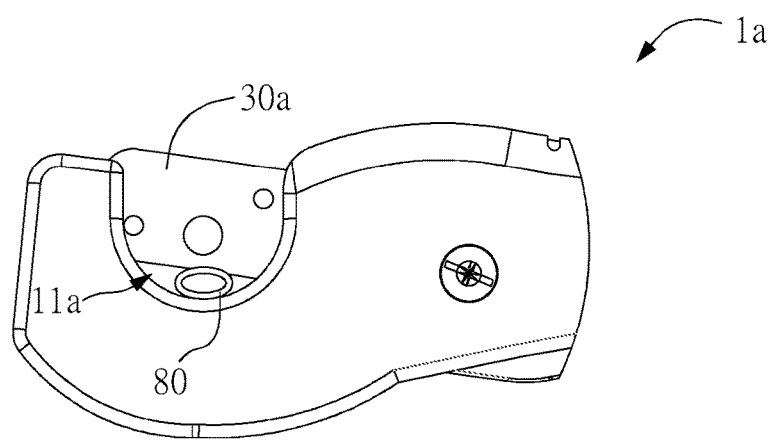
FIG. 1B illustrates a view of a traditional tube cutter cutting a tube and pressing the tube flat.

The advantages and innovative features of the invention will become more apparent from the following detailed description when taken in conjunction with the accompanying drawings.

Please refer to FIG. 2 to FIG. 4B for structural views of a tube cutter of the present invention.

As shown in FIG. 2 to FIG. 4B, in an embodiment of the present invention, a tube cutter 1 comprises a first clamp handle 10, a second clamp handle 20, a blade 30, a holder 40, a positioning mechanism 50, and a torsion spring 60.

Figure 2:
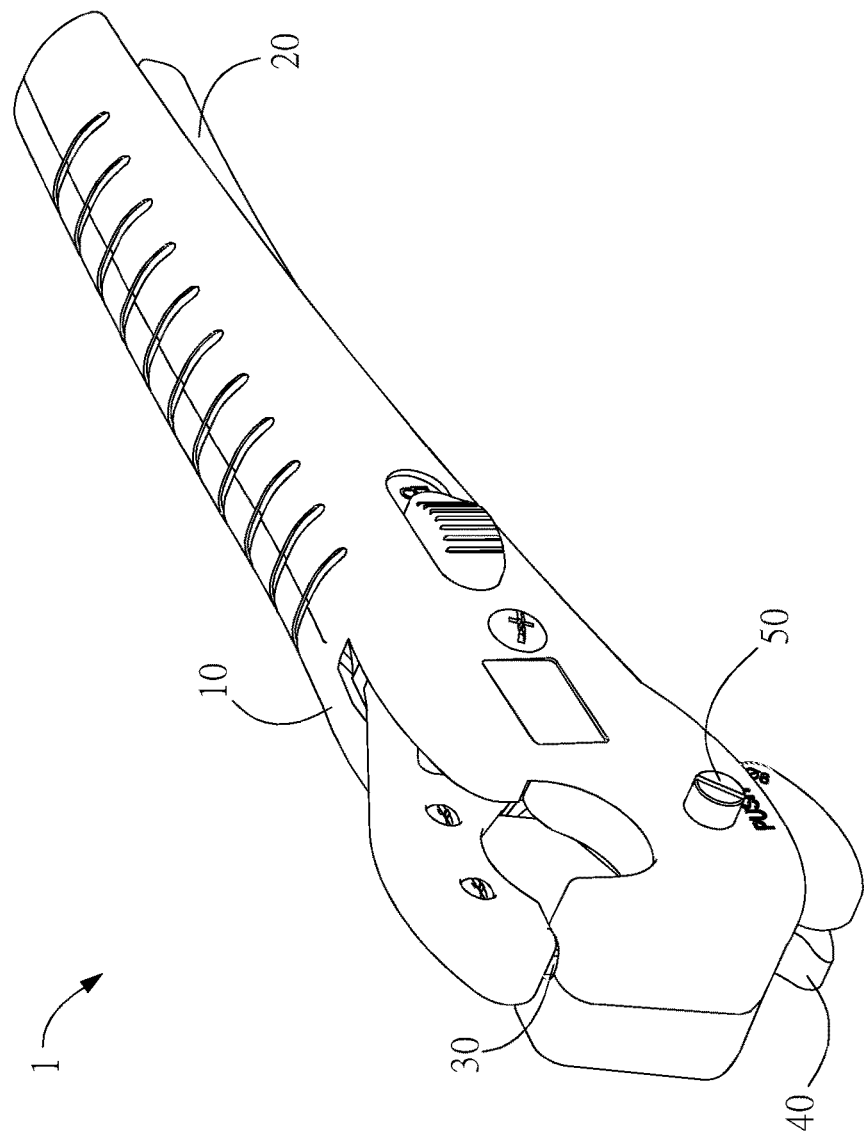
FIG. 2 illustrates a top view of a tube cutter of the present invention.
Figure 3:
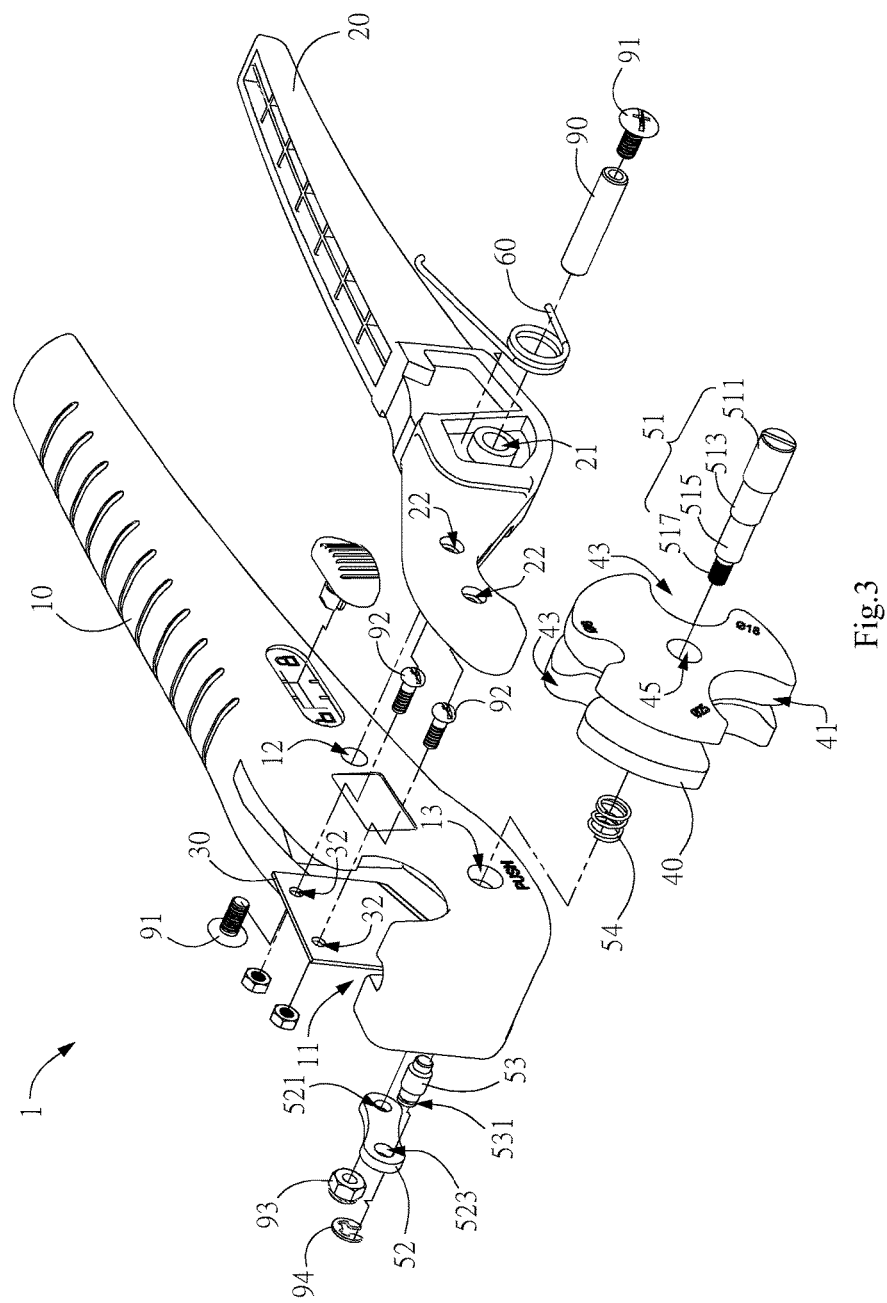
FIG. 3 illustrates an explosive view of the tube cutter of the present invention.

In an embodiment of the present invention, the first clamp handle 10 comprises an opening 11, two pivot holes 12 corresponding with each other, two perforations 13 corresponding with each other, and a positioning hole 14 (one of the pivot holes 12 and one of the perforations 13 are not shown in FIG. 2 and FIG. 3 because of the viewing angle).

In an embodiment of the present invention, the second clamp handle 20 comprises a pivot hole 21 and two connecting holes 22. The second clamp handle 20 is pivotally connected with the first clamp handle 10 by inserting a screw rod 90 through the pivot holes 12, 21. Two screws 91 are respectively attached to the two ends of the screw rod 90 to prevent the screw rod 90 from separating from the first clamp handle 10 and the second clamp handle 20.

In an embodiment of the present invention, the blade 30 comprises two blade holes 32. The blade 30 is fixedly connected with the second clamp handle 20 by inserting the two screws 92 through two connecting holes 22 and corresponding blade holes 32 respectively. A portion of the blade 30 can enter into the opening 11 by rotating the second clamp handle 20 with respect to the first clamp handle 10.

Figure 4A:
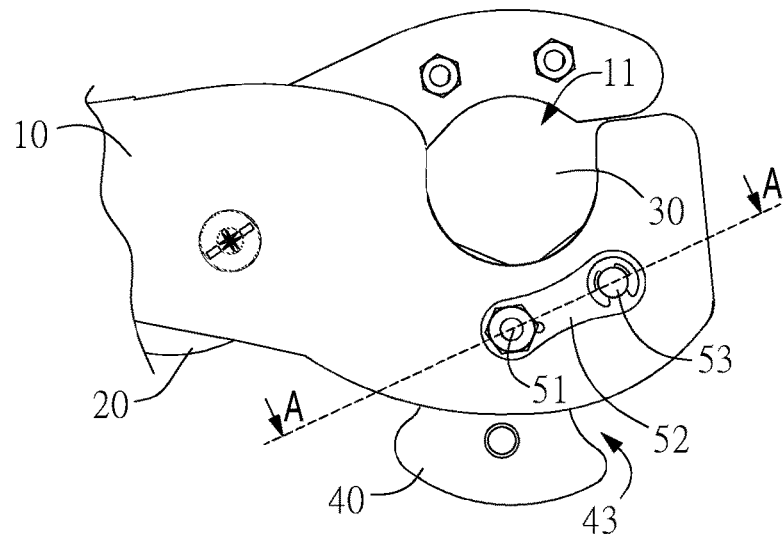
FIG. 4A illustrates an partially enlarged side view of the tube cutter of the present invention.
Figure 4B:
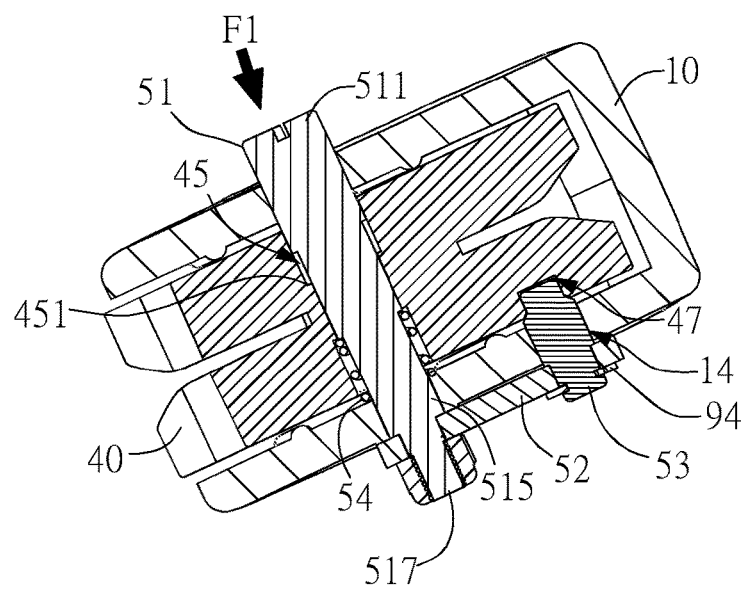
FIG. 4B illustrates a view of the tube cutter of the present invention along the A-A direction of FIG. 4A.

As shown in FIG. 3, FIG. 4A, and FIG. 4B, in an embodiment of the present invention, the holder 40 is formed in a disc shape. The holder 40 comprises a first recess 41, two second recesses 43, a through hole 45 and a cavity 47. The through hole 45 is disposed with a bump 451 therein. The width of the first recess 41 of the holder 40 is wider than those of the two second recesses 43, and the two second recesses 43 have different widths. The width of the first recess is substantially equal to that of the opening 11 of the first clamp handle 10.

In an embodiment of the present invention, a positioning mechanism 50 comprises a lever 51, a connecting rod 52, a positioning column 53 and a spring 54. The lever 51 comprises a retaining portion 511, a free portion 513, a fixation portion 515 and a thread portion 517. The connecting rod 52 comprises two holes 521, 523 disposed at the ends thereof. The diameter of the fixation portion 515 is larger than the size of the hole 521. The holder 40 is pivotally connected with the first clamp handle 10 by inserting the lever 51 through the through hole 45 and the perforation 13. The lever 51 is connected to the connecting rod 52 by inserting the thread portion 517 through the hole 521 of the connecting rod 52. A nut 93 is attached to the thread portion 517 to stop the connecting rod 52, thereby preventing the lever 51 from going through one end of the first clamp handle 10 to break away from the through hole 45. Furthermore, because the bump 451 is stopped by the retaining portion 511, the lever 51 will not break away from the through hole 45 from the other end of the first clamp handle 10 (as shown in FIG. 4B).

One end of the positioning column 53 goes through the hole 523 of the connecting rod 52 to be connected with one end of the connecting rod 52, and there is a slot 531 near the end of the positioning column 53. The other end of the positioning column 53 goes through the positioning hole 14 of the first clamp handle 10. A washer 94 is disposed on the slot 531 to prevent the positioning column 53 from separating from the connecting rod 52. The spring 54 is disposed on the fixation portion 515 of the lever 51 and is used for providing an elastic force to the lever 51. As shown in FIG. 4B, when a user does not press the retaining portion 511 of the lever 51, the positioning column 53 will remain inserted in the cavity 47 of the holder 40 by the elastic force of the spring 54 applied on the lever 51 (the cavity 47 substantially aligns with the positioning hole 14), thereby locking the holder 40 and preventing rotation of the holder 40. Once the user presses the retaining portion 511 of the lever 51 to cause the retaining portion 511 of the lever 51 to move towards the bump 451 (shown as the arrow F1 in FIG. 4B), then the connecting rod 52 moves away from the first clamp handle 10 and drives the positioning column 53 to withdraw from the cavity 47 of the holder 40. In other words, the positioning column 53 can be inserted into or withdrawn from the cavity 47 of the holder 40 by moving the lever 51.

Figure 5:
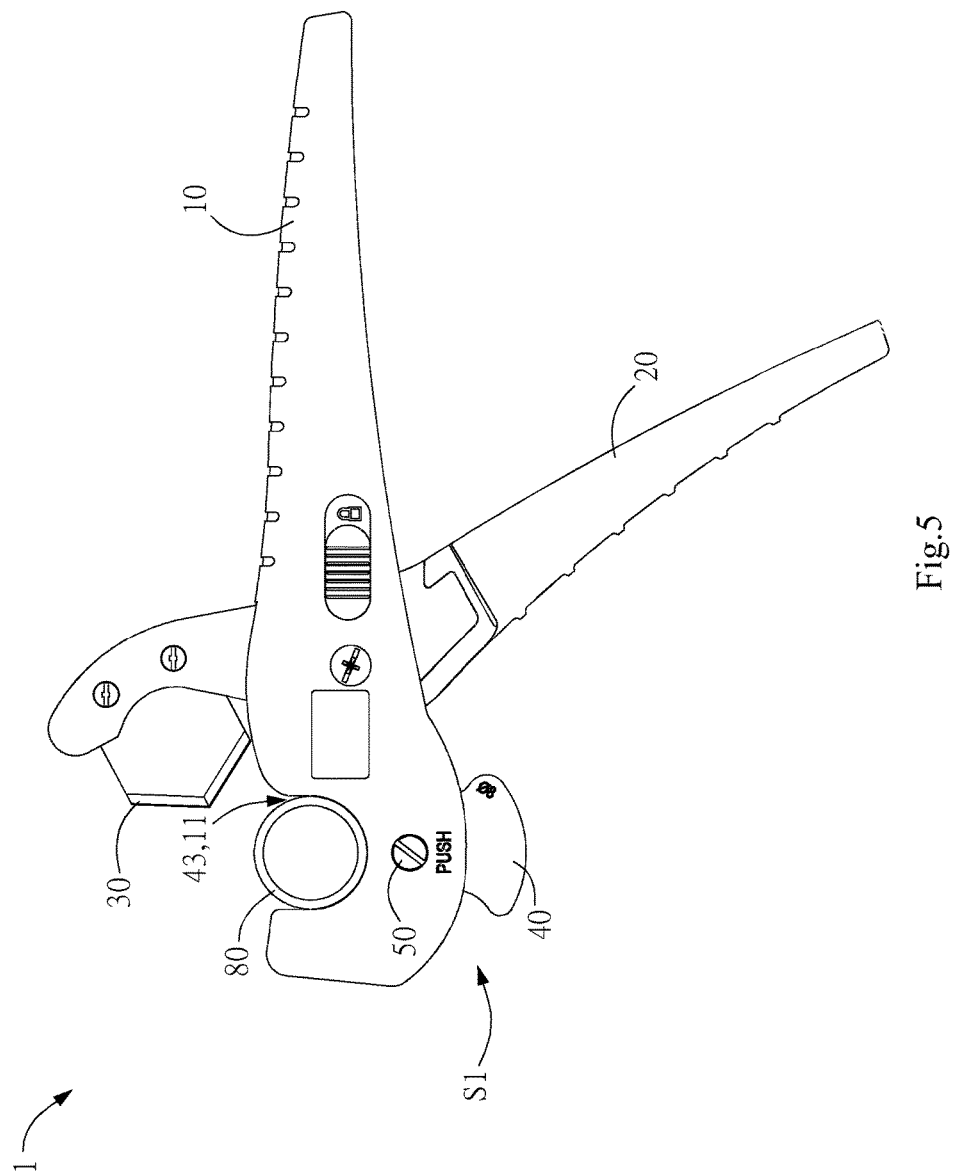
FIG. 5 illustrates a view of a first recess of a holder being placed at the opening of a first clamp handle.

In an embodiment of the present invention, the torsion spring 60 is disposed on the screw rod 90, and the torsion spring 60 provides an elastic torque to the screw rod 90 to keep the first clamp handle 10 and the second clamp handle 20 in an open state (as shown in FIG. 5).

Hereinafter, please refer to FIG. 5 to FIG. 7 for operation views of the tube cutter of the present invention.

Figure 7:
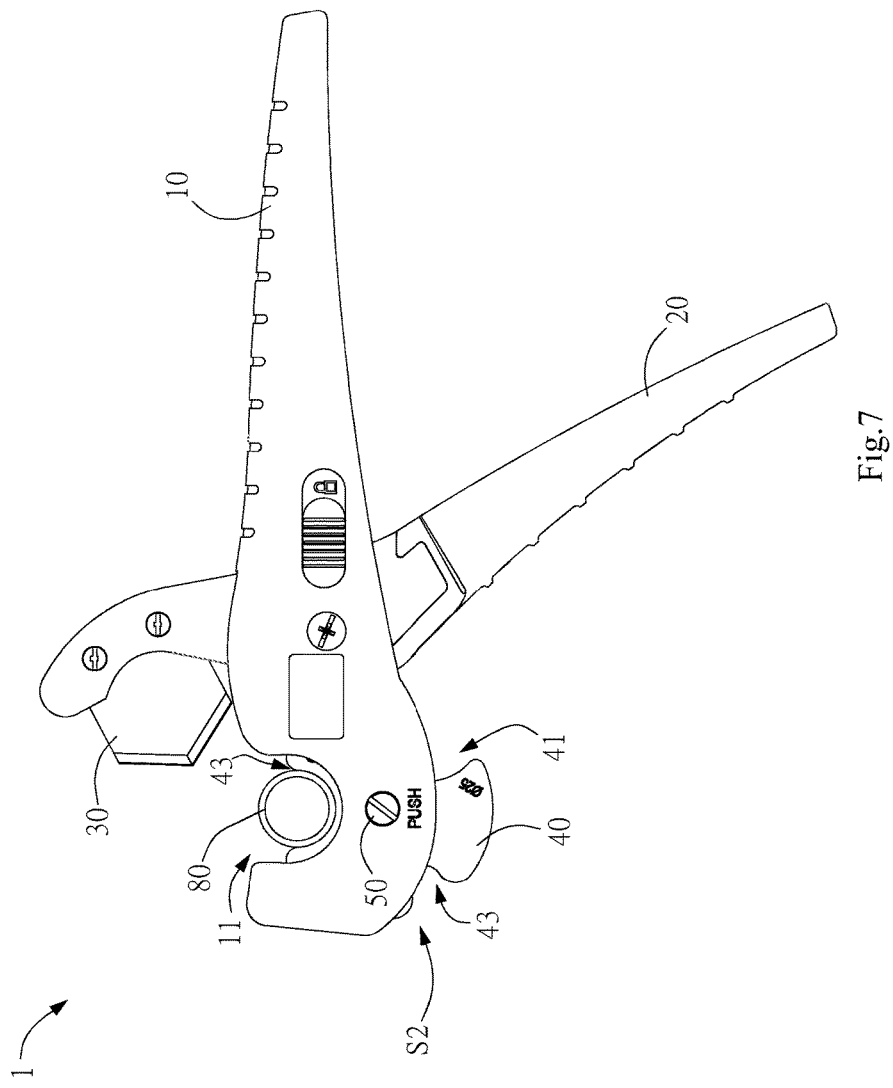
FIG. 7 illustrates a view when the second recess of the holder is located at the opening of the first clamp handle.

As mentioned above, the holder 40 of the tube cutter 1 of the present invention is pivotally connected with the first clamp handle 10 via the lever 51 such that the holder 40 can be rotated with respect to the first clamp handle 10 to form a first state S1 (as shown in FIG. 5) or a second state S2 (as shown in FIG. 7).

As shown in FIG. 5, when the holder 40 is in the first state S1, the first recess 41 of the holder 40 is located at the opening 11. In this state, the opening 11 and the first recess 41 allow a tube 80 having a larger size aperture to be placed therein, so the user can use the tube cutter to cut a tube 80 having a larger size aperture.

Figure 6:
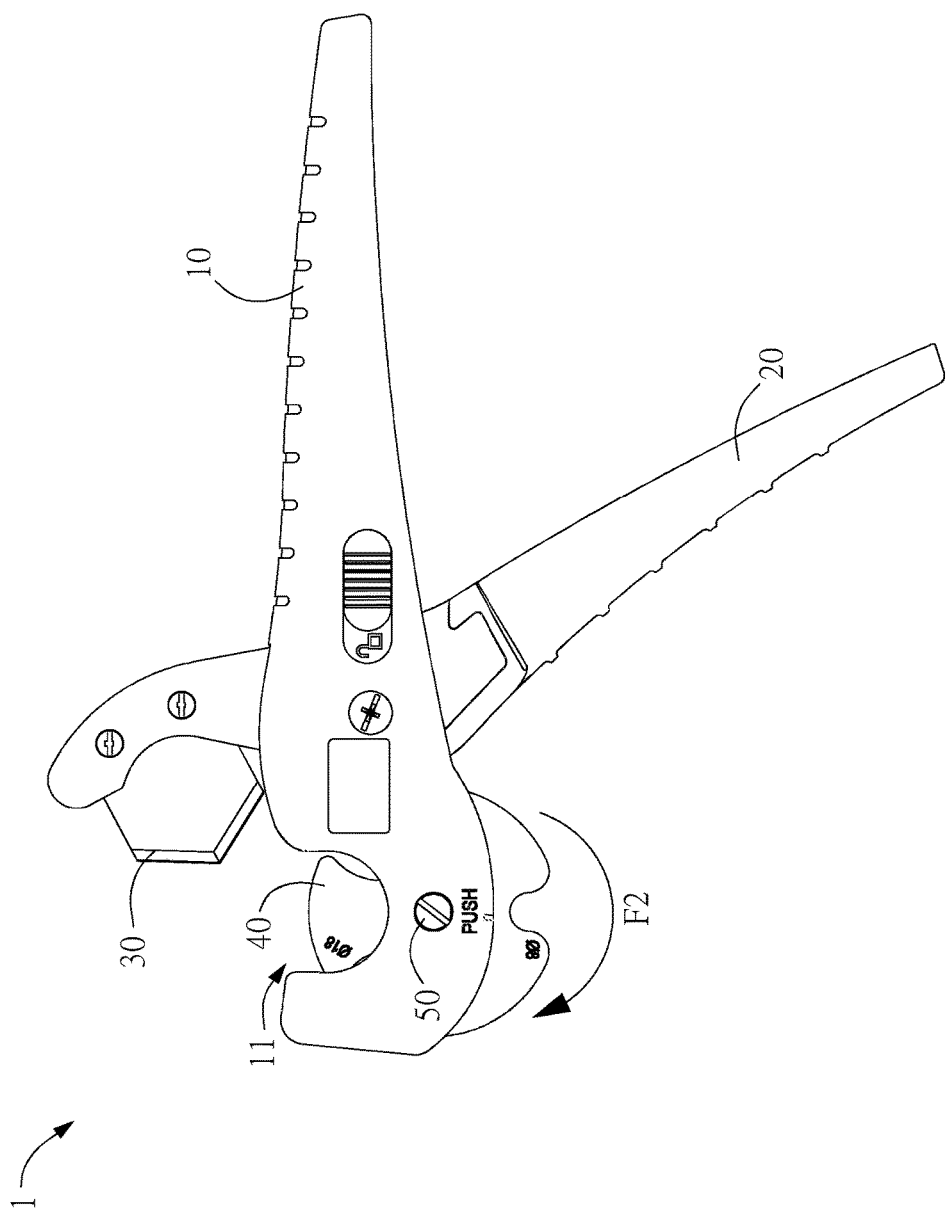
FIG. 6 illustrates a view of rotating the holder.

When the user needs to cut tubes 80 having smaller size apertures, the user can press the retaining portion 511 of the lever 51 to withdraw the positioning column 53 from the cavity 47 of the holder 40 and rotate the holder 40 in the direction F2 (as shown in FIG. 6) to cause the holder 40 to form the second state S2. In this state, the second recess 43 having a smaller width and located at the opening 11 allows a tube 80 having a smaller size aperture to be placed therein, so the user can use the tube cutter to cut a tube 80 having a smaller size aperture.

As described above, the tube cutter 1 uses the holder 40 which is rotatable and comprises recesses having different widths to contain tubes 80 having different size apertures. Therefore, the tube cutter 1 can cut tubes having different size apertures.

It is noted that the above-mentioned embodiments are only for illustration. It is intended that the present invention cover modifications and variations of this invention provided they fall within the scope of the following claims and their equivalents. Therefore, it will be apparent to those skilled in the art that various modifications and variations can be made to the structure of the present invention without departing from the scope or spirit of the invention.

What is claimed is:

1. A tube cutter comprising:
   a first clamp handle comprising an opening;
   a second clamp handle pivotally connected with the first clamp handle;
   a blade connected with the second clamp handle, wherein a portion of the blade enters into the opening by rotation of the second clamp handle;
   a holder comprising a first recess, at least one second recess, and a cavity, wherein the first recess has a width wider than that of the at least one second recess; and
   a positioning mechanism comprising a lever, a connecting rod, and a positioning column, wherein the holder is rotatable connected with the first clamp handle by the lever to form a first state or a second state when rotating with respect to the first clamp handle, wherein the first recess is located at the opening when the holder is in the first state and the second recess is located at the opening when the holder is in the second state, wherein the cavity extends parallel to and spaced from the lever, wherein the lever is slideably combined with the first clamp handle and the holder, wherein the lever is connected to one end of the connecting rod, wherein the positioning column is connected to another end of the connecting rod and extending parallel to and spaced from the lever, with the lever, the connecting rod, and the positioning element having a U-shape, with the lever, connecting rod and the positioning element being moveable relative to the holder and the first clamp handle, and wherein the positioning column is inserted into or withdrawn from the cavity by moving the lever and the connecting rod, with the first recess and the at least one second recess used to hold tubes having different size apertures to allow the tube cutter to cut tubes having different size apertures.

2. The tube cutter as claimed in claim 1, wherein the positioning mechanism further comprises a spring disposed on the lever to provide an elastic force to the lever.

3. The tube cutter as claimed in claim 1, wherein the at least one second recess comprises two second recesses with different widths.

4. The tube cutter as claimed in claim 1, wherein the holder is formed in a disc shape.

5. The tube cutter as claimed in claim 1, wherein the first recess has a width substantially equal to that of the opening.

* * * * *